A. H. FOX & A. W. LENDEROTH.
MAGNETIC CONTROL SYSTEM FOR RAILWAYS.
APPLICATION FILED MAY 22, 1909.
1,007,192.
Patented Oct. 31, 1911.
5 SHEETS—SHEET 1.
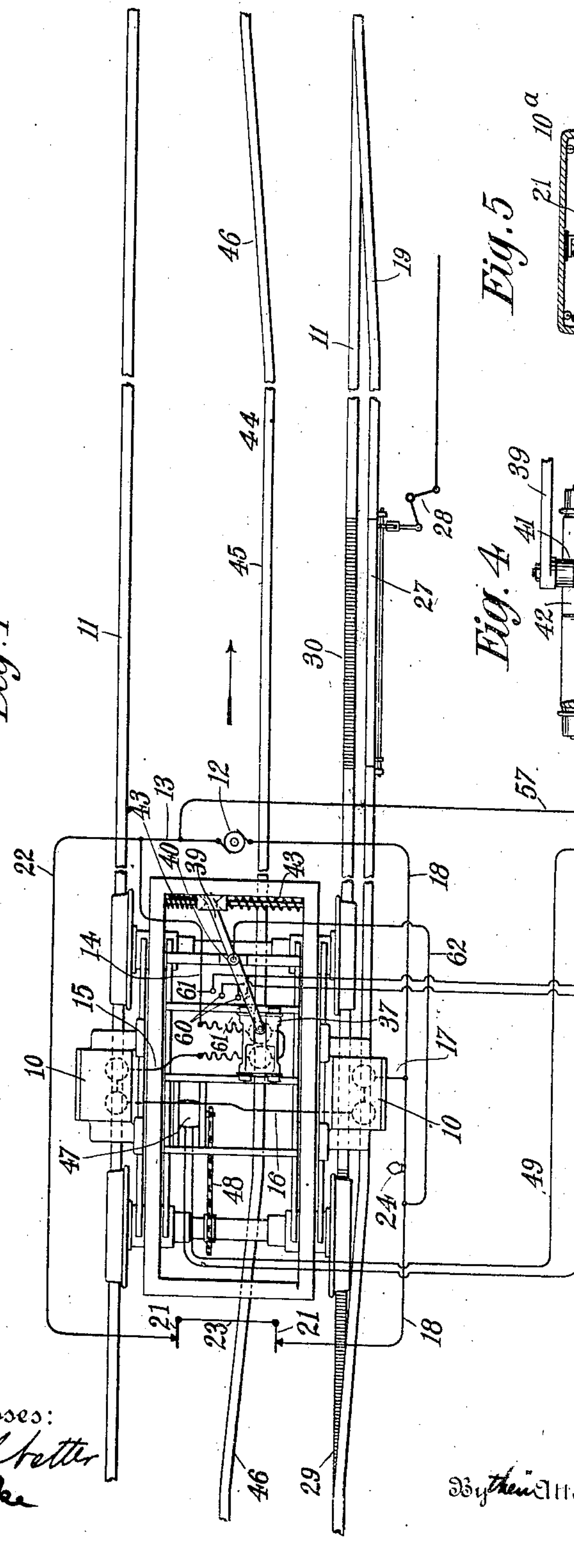
Witnesses:
Raphael Netter
F. Blake
Inventors
A. H. Fox
A. W. Lenderoth
By their Attorney
Robert W. Pierson A. H. FOX & A. W. LENDEROTH.
MAGNETIC CONTROL SYSTEM FOR RAILWAYS.
APPLICATION FILED MAY 22, 1909.
1,007,192.
Patented Oct. 31, 1911.
5 SHEETS—SHEET 2.
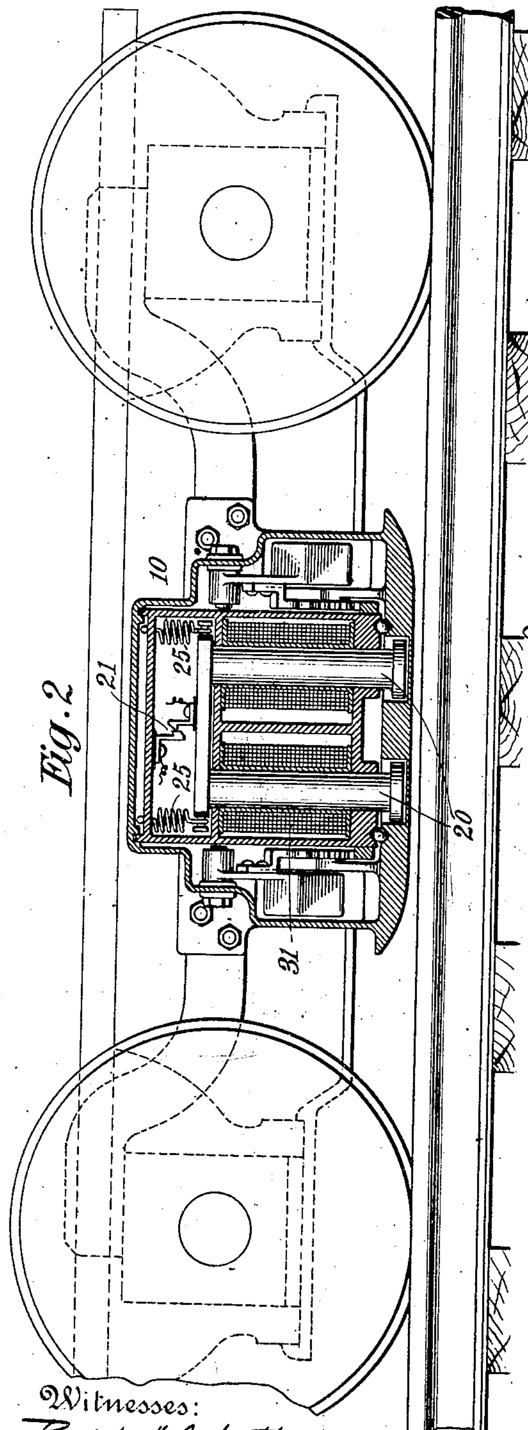
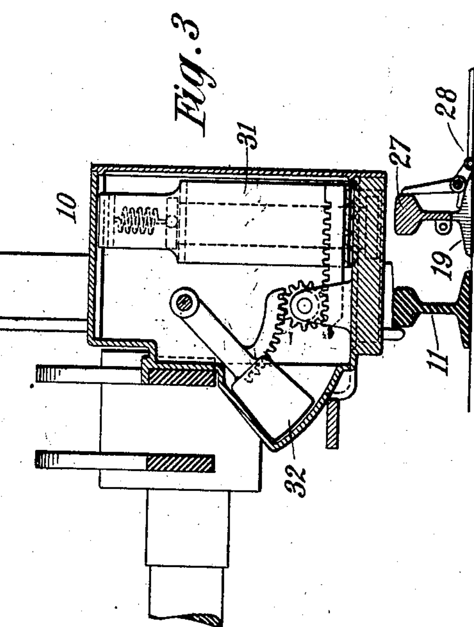
Witnesses:
Raphaël Netter
G. Blake
Inventors
A. H. Fox
A. W. Lenderoth
By their Attorney
Robert W. Pierson A. H. FOX & A. W. LENDEROTH.
MAGNETIC CONTROL SYSTEM FOR RAILWAYS.
APPLICATION FILED MAY 22, 1909.
1,007,192. Patented Oct. 31, 1911.
5 SHEETS—SHEET 3.
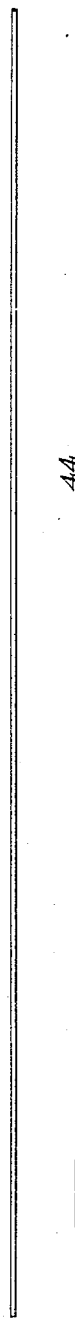
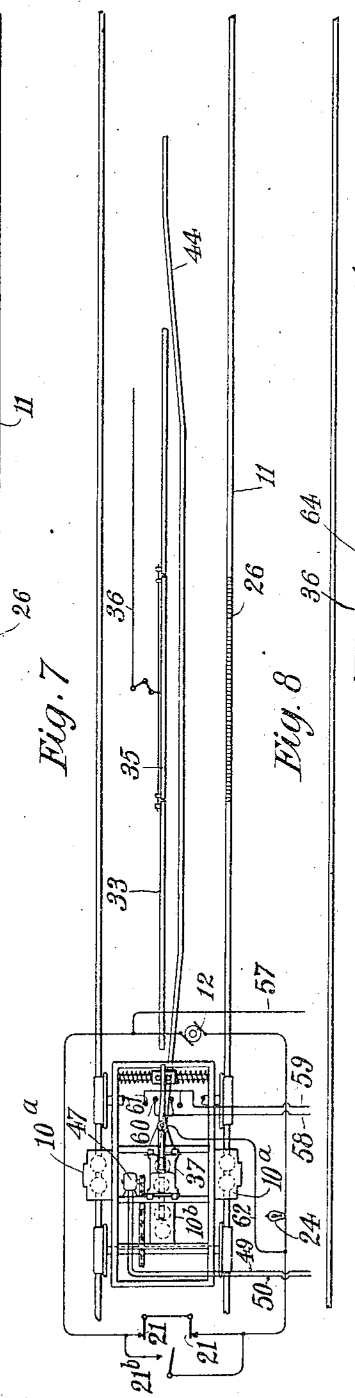
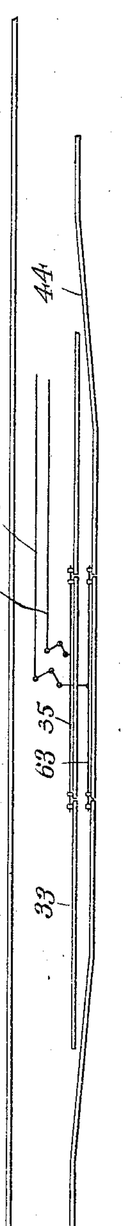
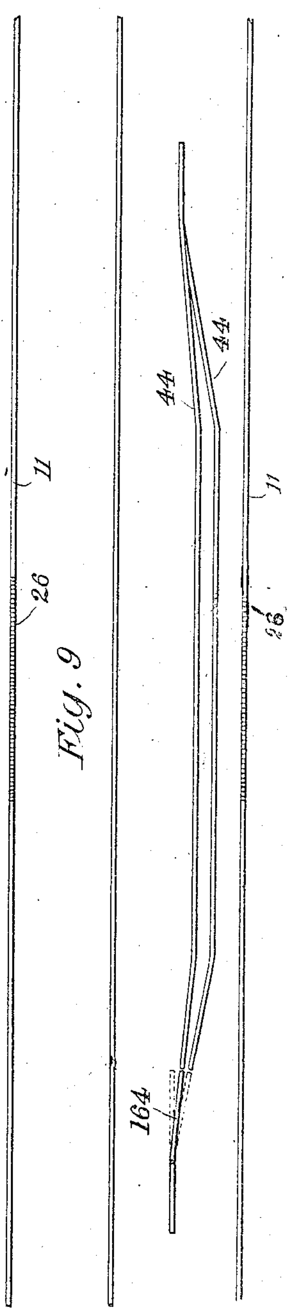
Witnesses:
Raphaël Netter
G. Blake
Inventors
A. H. Fox
A. W. Lenderoth
By their Attorney
Robert W. Pierson A. H. FOX & A. W. LENDEROTH.
MAGNETIC CONTROL SYSTEM FOR RAILWAYS.
APPLICATION FILED MAY 22, 1909.
1,007,192.
Patented Oct. 31, 1911.
5 SHEETS—SHEET 4.
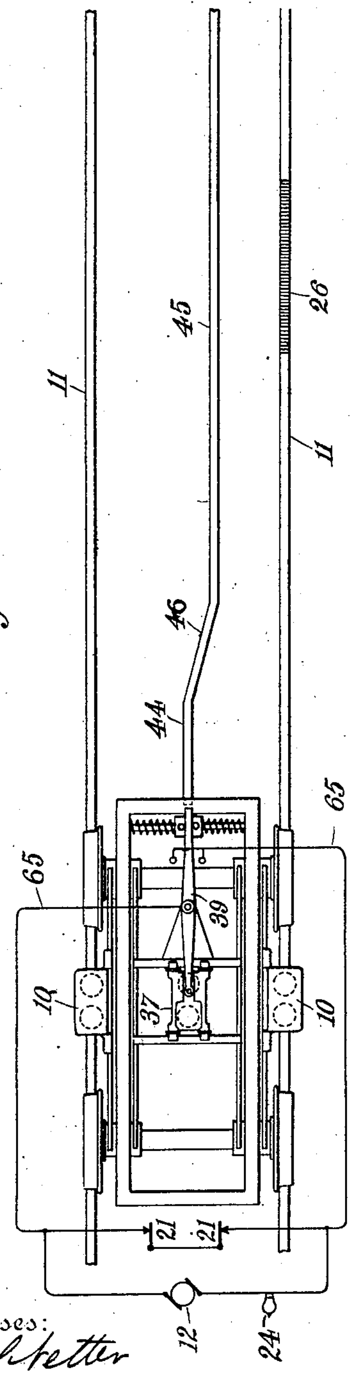
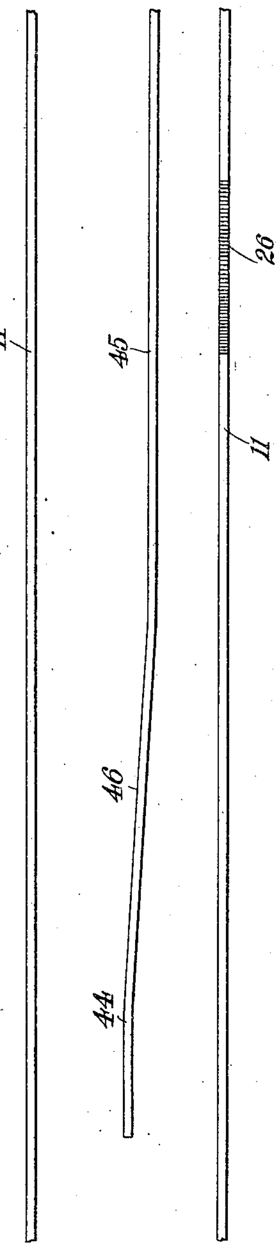
Witnesses:
Raphaël Netter
G. Blake
Inventors
A. H. Fox
A. W. Lenderoth.
By their Attorney
Robert M. Pierson A. H. FOX & A. W. LENDEROTH.
MAGNETIC CONTROL SYSTEM FOR RAILWAYS.
APPLICATION FILED MAY 22, 1909.
1,007,192.
Patented Oct. 31, 1911.
5 SHEETS—SHEET 5.
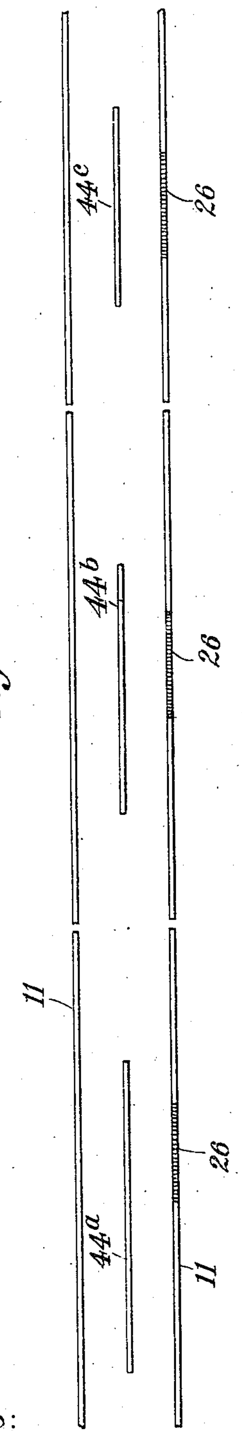
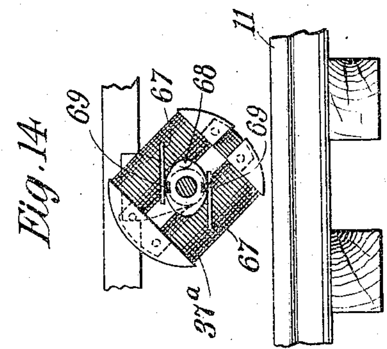
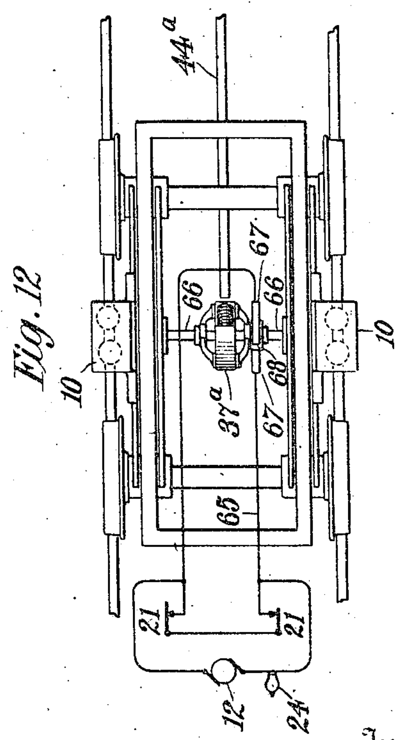
Witnesses:
Raphaël Netter
F. Blake
Inventors
A. H. Fox
A. W. Lenderoth
By their Attorney
Robert W. Pierson

UNITED STATES PATENT OFFICE.

AUSTEN H. FOX, OF NEW YORK, AND ARNOLD W. LENDEROTH, OF STAPLETON, NEW YORK.

MAGNETIC CONTROL SYSTEM FOR RAILWAYS.

1,007,192. Specification of Letters Patent. Patented Oct. 31, 1911.

Application filed May 22, 1909. Serial No. 497,620.

*To all whom it may concern:*

Be it known that we, AUSTEN H. FOX and ARNOLD W. LENDEROTH, citizens of the United States, residing at New York city, in the county and State of New York, and at Stapleton, in the county of Richmond and State of New York, respectively, have invented certain new and useful Improvements in Magnetic Control Systems for Railways, of which the following is a specification.

This invention relates to means for establishing communication between a railway vehicle and roadway by means of a magnet carried by the vehicle and coöperating with an armature on the roadway, and the primary object of our invention is to prevent the moving unit from exceeding given rates of speed at certain points on the roadway, such as curves, bridges, etc., or at any predetermined control point.

To this end our invention consists in the general and subordinate combinations and the specific instrumentalities of which certain preferred embodiments are hereinafter described.

Figure 1 of the accompanying drawings represents a plan view of a truck and roadway equipped according to our invention. Fig. 2 represents a longitudinal section showing one of the detector-magnets carried by the truck. Fig. 3 represents a cross-section thereof. Fig. 4 represents a longitudinal section of the laterally-movable speed-rail magnet. Fig. 5 represents a similar view showing a fixed middle magnet adapted for use with the roadway armature arrangement of Figs. 7 and 8. Figs. 6–9 inclusive represent plan views of different arrangements which may be employed in the roadway. Fig. 10 represents a plan view of a modification which merges in one instrument certain functions performed by a plurality of instruments in Fig. 1. Fig. 11 represents a plan c a speed-rail for this modification. Figs. 12 and 13 represent similar views for another modification, and Fig. 14 represents a side elevation of the pivoted magnet employed therein.

We have here shown and prefer to employ our invention in combination with an automatic stopping or controlling system forming the subject of separate applications of Austen H. Fox, Serial No. 423,139, filed March 25, 1908, and Serial No. 481,780, filed March 6, 1909, although not wholly confining ourselves thereto. The elements of that system as here shown comprise an electromagnetic detector 10 mounted in duplicate on the two sides of the vehicle over the running rails 11 and constantly energized by connection in series with a generator 12, the connection being by way of the wires 13, 14, 15, 16, 17, and 18. Each of these magnets may have the construction represented in Figs. 2 and 3 which provides for a lateral movement of the magnet as a whole within its casing to bring it over the running rail 11 or over a by-passing rail 19 shown in Fig. 1, and also a vertical movement of the core 20 of said magnet to open and close a switch 21. For the sake of clearness the switches 21 are shown diagrammatically and detached from their detectors 10 in Fig. 1, being included in circuit with the generator 12 through the wires 22, 23, 18, and also in circuit with a lamp 24 whose lighting or extinguishment is representative of a variety of well-known operations which may be performed on the vehicle by the action of the controlling devices, such as setting the air-brakes, closing the engine-throttle etc., or the mere giving of an audible or visible cab-signal. For convenience we designate these functions generically as the giving of an "indication."

So long as the detector cores 20 are drawn down toward the magnetic running rails 11 the switches 21 remain closed and the lamp 24 will glow, but when one of the magnets 10 reaches a magnetic gap in the running rail the core is released and a suitable elevating force such as that furnished by springs 25 (Fig. 2) raises the cores and opens the switch 21, thereby breaking the circuit of the lamp 24.

A magnetic gap in the right-hand running rail is shown in Fig. 6 at 26, representing for example a rail section made of manganese steel, the effect of whose presence would be to release the core of the right-hand detector magnet and, unless counteracted, to extinguish the lamp as described. This effect may be regularly and permanently enacted at the given point or it may be counteracted at will in various ways, one of which we will now describe.

In Fig. 1 the detector magnet 10 is subjected to external control at will by means of the by-passing rail 19 containing a pivoted section 27 adapted to drop out of the magnetic field unless it be sustained by the external operating connections 28. The running rail 11 is made of manganese steel at 29 and 30 opposite the point where the by-passing rail 19 departs and opposite the movable section 27 (or it might be for the whole length of rail 11 opposite the by-passing rail). On reaching a by-passing rail the magnet 31 (see Figs. 2 and 3) is drawn off laterally in its guides to follow the rail 19 and if the movable section 27 be retracted to leave a gap, the core 20 will be released and the switch 21 opened, but if the movable section 27 be elevated in place, the switch will remain closed and the lamp 24 lighted. A counter-weight 32 tends to keep the magnet 31 over the running rail 11 but is overcome by the magnetic side pull just described. Other modes of controlling the action of the detector magnet at will may be used and in Fig. 7 for example the detectors $10^a$ may comprise fixed magnets $31^a$ of the character shown in Fig. 5 adapted to remain constantly over the running rails and having only the vertical movements of their cores 20 to open and close switches 21. These magnets, being fixed as to their lateral position, will always open their switches 21 whenever a manganese steel section 26 is reached in the running rail, and if it is desired to counteract their effect at will, a middle magnet $10^b$ of the same character (Fig. 5) is employed in connection with a middle rail section 33 located opposite to and overlapping the manganese steel section 26, said magnet controlling a switch $21^b$ located in a shunt 34 around the switches 21. Rail 33 contains a movable section 35 similar to the movable section 27 previously described, and controlled by external connections 36. When section 35 is alined with the rail 33 the core of magnet $10^b$ will remain down while the vehicle is passing the control point and lamp 24 will remain lighted by the action of switch $21^b$ in shunting the switches 21, but if section 35 be displaced, the shunt will be broken and hence no counter-action will take place.

Proceeding now to describe the form of our invention shown in Figs. 1–9, it may be stated that we employ a series of armatures on the roadway corresponding in their lateral positions to certain maximum speeds to which it is desired to limit the moving unit, and preferably located a sufficient distance in advance of the curve, bridge, switch, cross-over, or other slow-down point to enable the unit to be automatically stopped in advance of the slow-down point if it has not been brought down to such speed before passing the control point. On the vehicle there is arranged a magnet structure responsive to these roadway armatures and a selector preferably controlled by the speed of the vehicle for determining the roadway-armature position to which the vehicle magnet structure shall respond. In the particular embodiment herewith illustrated the magnet structure is a single magnet mounted for lateral movement in response to the action of the armatures or "speed rails" in the roadway.

Referring to Fig. 1, 37 is the speed magnet, represented also in Fig. 4, mounted to move laterally on cross-guides 38 on the truck and included in circuit with the generator 12 and the detectors 10, 10 so as to be constantly energized. An arm 39 pivoted to the truck frame at 40 carries at one end a roller 41 engaging a track-way 42 in the frame of the magnet 37 whereby the arm swings with the travel of the magnet, and the opposite end of said arm is held between centralizing springs 43 which tend to keep the magnet in a middle position. 44 represents a magnetic armature rail or speed rail mounted in the roadway for coöperation with magnet 37, said rail having a middle straight portion 45 at one side of the middle line of the roadway and diagonal portions 46 connecting the laterally-warped portion 45 with the middle line of the roadway.

On the vehicle is placed a suitable speed manifester which we have shown as a dynamo 47 driven by a chain 48 from one of the truck axles, the wires 49, 50 from said dynamo leading to a solenoid 51 on the vehicle which constitutes a speed-responsive device, the core 52 of said solenoid being drawn inwardly, against the force of gravity or of a spring 53, a distance varying according to the vehicle speed which determines the strength of the dynamo current. The stem of core 52 carries a sliding contact-piece 54 interposed between two pairs of brushes 55, 56, the brushes on one side being connected by a wire 57 with one side of the generator 12 and the brushes on the other side being connected by two wires 58, 59 respectively with two pairs of contacts 60, 61 mounted under the arm 39. The pivot 40 of arm 39 is connected by a wire 62 with the wire 18 at a point between lamp 24 and the switches 21. Therefore the multiple circuit which includes wires 57, 58, 59, brushes 55, 56, and contacts 60, 61, together with the arm 39 and wire 62 constitutes a shunt on the switches 21 so that the lamp 24 will remain illuminated even though the switches 21 are opened by the detector magnets 10, provided this shunt circuit is complete. The shunt circuit may exist through either of the wires 58 or 59.

To understand the operation it may be assumed that the wire 58, the brushes 55 and the inner pair of contacts 60 correspond to a certain speed, say 30 miles an hour, and the wire 59 together with the brushes 56 and the outer pair of contacts 61 corresponds to a certain lower speed, say 10 miles an hour. This means that so long as the speed of the vehicle remains below 10 miles an hour the dynamo 47 acting through the solenoid 51 will not furnish sufficient current to break the electrical connection between the brushes 56. At speeds above 10 miles and less than 30 miles the circuit across the brushes 56 and through the wire 59 is broken but the circuit through wire 58 remains intact. At speeds above 30 miles an hour the contact 54 slides off both sets of brushes and both circuits are broken. While the illustration provides for only two speeds it will be understood that a greater or smaller range is permitted by having more or less contacts in the series 60, 61 and corresponding wires and brushes. On reaching a point where a speed rail 44 is laid, the attraction of said rail for the speed magnet 37 will move the latter into a lateral position corresponding to the distance of the straight-line part 45 of the rail from the middle line of the track and this will bring the arm 39 onto one of the contacts 60 or 61. In Fig. 1 the speed rail has automatically selected one of the contacts 61 which is that of the 10-mile circuit, and therefore, so long as the speed remains below 10 miles an hour and the brushes 56 remain on the sliding contact 54, a shunt is established around the switches 21 and consequently the opening of a switch 21 by a detector 10 when a magnetic gap is reached does not extinguish the lamp 24. If, however, the speed exceeds 10 miles an hour the brushes 56 will be off the sliding contact 54, and when a magnetic gap due to the retraction of a rail section 27 is reached by the detector magnet 10 the lamp will be extinguished. Instead of the mere extinguishment of the lamp the function performed might be the slowing or stoppage of the vehicle through the use of well-known devices in place of lamp 24, as previously mentioned. On the other hand, the vehicle may reach a point where a speed of 30 miles but not greater is permitted, and in advance of this point a speed rail 44 will be placed with its middle part in such a lateral position as to bring the arm 39 onto one of the inner contacts 60 which pertain to the 30-mile circuit including brushes 55. The switches 21 will then be shunted so long as brushes 55 remain on the contact 54, but the lamp will be extinguished by the action of the detector 10 if the speed exceeds 30 miles. Hence it may be said that the speed devices on the vehicle, which in this instance include both the magnet 37 with its selector contacts, and the dynamo or speed manifester 47 together with the solenoid 51 and its armature contacts, are responsive to each particular roadway armature 44 at a selected rate or over a given range of speed, and this characteristic inheres also in the simplified embodiments of our invention hereinafter described.

In Fig. 6, a speed rail 44 is shown opposite a manganese-steel section 26 in the running rail which has no appurtenant means for controlling the detector at will. The indication will therefore always be given on the vehicle unless the speed be below a rate corresponding to the position of the speed rail.

In Fig. 7 the giving of the indication may be counteracted at will by the presence, in the middle rail 33, of the movable section 35 operated by external connections 36 and controlling a middle magnet $10^b$ on the truck which operates a switch $21^b$ for shunting the effect of the switches 21 of the running-rail detector magnets $10^b$ as previously described. Except for the laterally-fixed character of the detectors $10^a$ and the introduction of the detector $10^b$ with its switch, the arrangements on the truck of Fig. 7 are or may be the same as in Fig. 1.

Fig. 8 represents in addition to the track arrangement of Fig. 7, a movable magnetic filler 63 for the speed rail 44, operated by external connections 64, for eliminating at will the controlling influence of rail 44 when the non-magnetic section 26 is reached by the corresponding side magnet $10^a$.

In Fig. 9 we have shown two speed rails 44 at a control point corresponding to different maximum speeds and having a pivoted initial section 164 adapted to be swung horizontally by any suitable means into line with either of the two rails so that one or the other may be made active at will.

In Fig. 10 the speed-manifesting dynamo 47 of Fig. 1 is omitted and its functions merged in those of the laterally-movable magnet 37 which coöperates with a speed-rail 44 in the roadway in giving a direct manifestation of the speed of the vehicle. For that purpose the diagonal section 46 of the speed-rails at the different control points is given an angle corresponding to the maximum permitted speed at each point, and the arm 39 of the magnet operates directly to complete a shunt circuit 65 around the switches 21 of the detectors 10 when the speed is below the predetermined point. If, however, the vehicle is traveling faster than the speed corresponding to the angle of rail-section 46 at the particular control-point, the inertia and friction of magnet 37 and its mechanical connections will not be overcome sufficiently to cause the shunt to be closed before the magnet has passed section 46 and when one of the switches 21 is opened by its detector 10 on reaching a non-magnetic section 26 the lamp 24 will be extinguished unless this effect be counteracted by some such devices as the members 19 and 27 in Fig. 1. In Fig. 10 the diagonal rail-section 46 is relatively abrupt and corresponds to a slow maximum speed, while in Fig. 11 the slant of 46 is more gradual and corresponds to a higher vehicle speed. The same idea in modified form is represented in Figs. 12, 13, and 14, motion in a vertical plane being substituted for the horizontal motion of Fig. 10. In this case the rail sections $44^a$, $44^b$, $44^c$ are parallel with the running rails 11 and are made of varying lengths at the several control points to correspond with the different maximum speeds, and magnet $37^a$ is mounted on horizontal trunnions 66 and normally turned at an angle as shown in Fig. 14 by the coaction of spring brushes 67 with an elliptical or cam-shaped hub 68. In this position the brushes rest on insulating blocks 69 at the ends of the minor axis of the hub, but the attraction of a middle rail-section $44^a$, $44^b$, or $44^c$, sufficiently long-continued, will move the magnet $37^a$ toward a vertical position and the metallic body of the hub 68 then acts as a connector between the brushes 67 to close the shunt 65 around the switches 21 and prevent the giving of the indication. The sum of the moment of inertia and the friction of the magnet $37^a$ being substantially a constant, the time required to overcome it with the constant force represented by the pull of the magnet acting from a constant initial distance, and thus to bring about the shunting action, will also be a constant, and unless equaled or exceeded by a proper relation between the speed of the vehicle and the length of the particular speed-rail section, the shunting will fail to take place.

Various other modifications may be made within the scope of our invention.

We claim,—

1. In a railway-vehicle controlling system, the combination with the roadway and vehicle, of an armature on the roadway, and means on the vehicle controlled by the latter's speed and including an electro-magnetic device which coöperates with said armature, for causing a speed-selective response of said means to the armature.

2. In a railway-vehicle controlling system, the combination with the roadway and vehicle, of a series of differentiated armature-sections on the roadway, and a magnet structure on the vehicle differently responsive to the several armature-sections.

3. In a railway-vehicle controlling system, the combination with the roadway and vehicle, of a series of differentiated armatures on the roadway, and means including a movable magnet whose posture on the vehicle is affected differently by the several armatures, for giving an indication when certain predetermined speeds are exceeded.

4. The combination with a railway, of armature-sections of different effective lengths located at a series of control points on said railway and distinct from the running-rail structure thereof.

5. In a railway-vehicle controlling system, the combination with the roadway and vehicle, of a movable magnet on the vehicle, and a series of armatures on the roadway adapted to operate said magnet and having respectively different lengths.

6. In a railway-vehicle controlling system, the combination with the roadway and vehicle, of an armature on the roadway, and a magnet pivoted to turn on the vehicle in a substantially vertical plane, said magnet being biased toward a horizontal position and adapted to be attracted by said armature toward a vertical position.

7. In a railway-vehicle controlling system, the combination with the roadway and vehicle, of a series of roadway armature sections of different lengths corresponding to different vehicle speeds, a magnet pivoted to turn on the vehicle in a vertical plane in response to its attraction for the armature-sections, and means controlled by said magnet for performing a function on the vehicle.

8. In a railway-vehicle controlling system, the combination with the roadway and vehicle, of a roadway armature continuous between control points, a detector magnet on the car coöperating with said armature and adapted, when released, to produce an indication on the vehicle, and co-acting devices on the vehicle and roadway for preventing the indication at vehicle speeds below a predetermined maximum.

9. In a railway-vehicle controlling system, the combination with the roadway and vehicle, of means for establishing continuous magnetic attraction between the vehicle and roadway except at control points, means for giving an indication on the vehicle by the interruption of said attraction, a series of armature-sections on the roadway, and means on the vehicle controlled by the vehicle speed and including an electro-magnetic device which coöperates with said armature sections to prevent the giving of the indication except when certain predetermined speeds are exceeded at the points where said sections occur.

10. In a railway-vehicle controlling system, the combination with the roadway and vehicle, of an armature rail substantially coextensive with the roadway and magnetically differentiated at control points, a detector magnet on the vehicle coöperating with said rail, an indicating circuit having a switch controlled by said detector magnet.

and means for shunting said switch in passing said control points at vehicle speeds below a predetermined maximum.

11. In a railway-vehicle controlling system, the combination with the roadway and vehicle, of an armature rail substantially coextensive with the roadway and magnetically differentiated at control points, a magnet on the vehicle coöperating with said rail, an indicating circuit having a switch controlled by said magnet, a shunt circuit around said switch, a series of armature sections located on the roadway at the control points and having different durations of magnetic effect at a given vehicle speed, and a movable magnet on the vehicle controlled by said armature sections and controlling the shunt circuit.

In testimony whereof we have hereunto set our hands in the presence of two subscribing witnesses, this 20 day of May 1909.

AUSTEN H. FOX.
ARNOLD W. LENDEROTH.

Witnesses:
EDWARD E. BLACK,
R. M. PIERSON.